(No Model.) 2 Sheets—Sheet 1.
C. F. PIDGIN & F. H. LEONARD, Jr.
CALCULATING MACHINE.
No. 284,755. Patented Sept. 11, 1883.
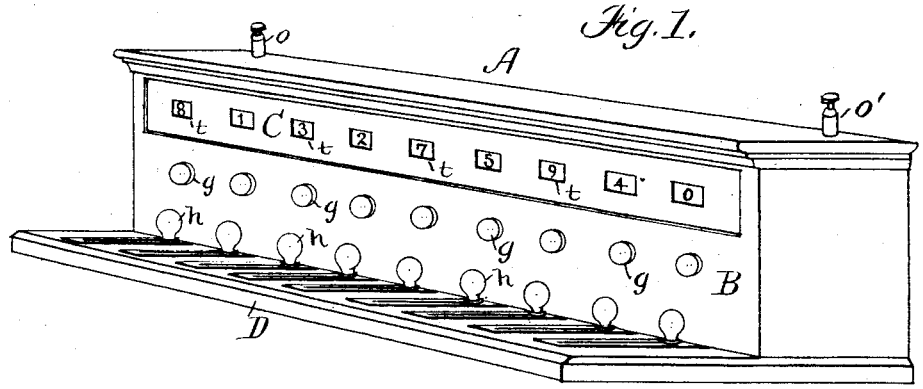
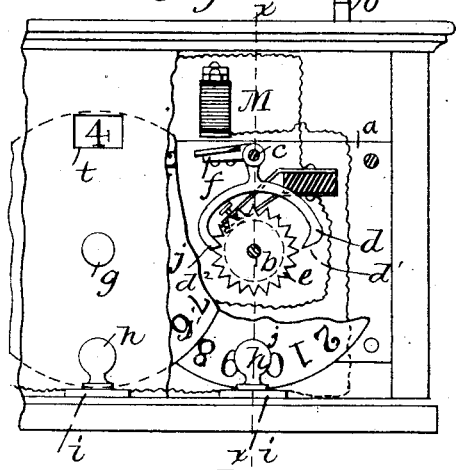
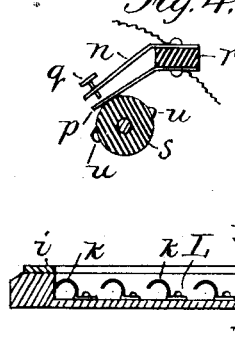
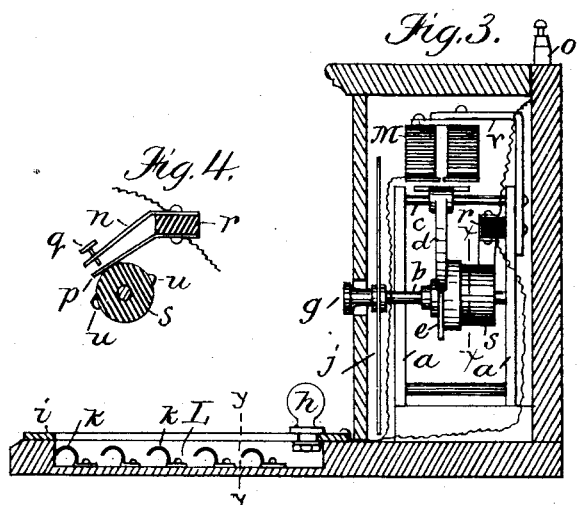
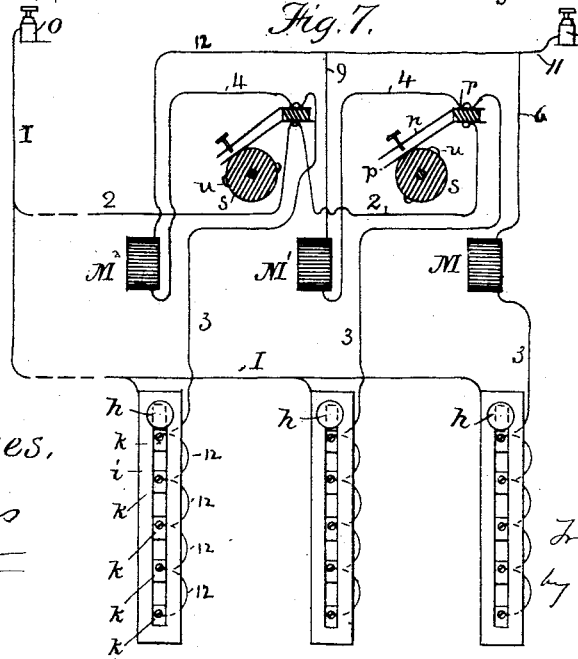
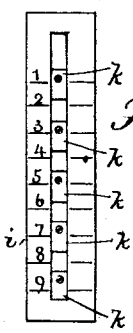
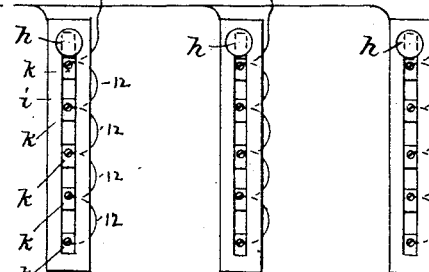
Witnesses.
Inventors.
Charles F. Pidgin
Francis H. Leonard Jr.
by Wright & Brown
Attys.
N. PETERS, Photo-Lithographer, Washington, D. C.

(No Model.) 2 Sheets—Sheet 2.
C. F. PIDGIN & F. H. LEONARD, Jr.
CALCULATING MACHINE.
No. 284,755. Patented Sept. 11, 1883.
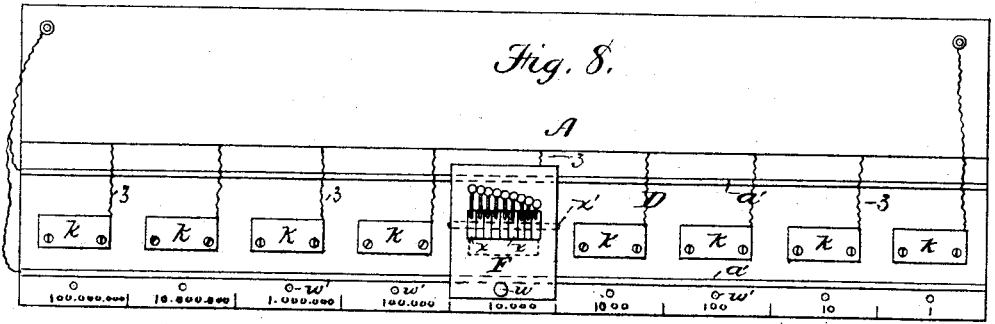
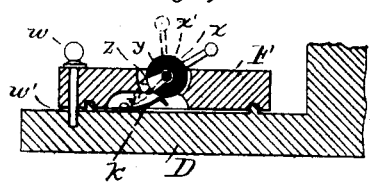
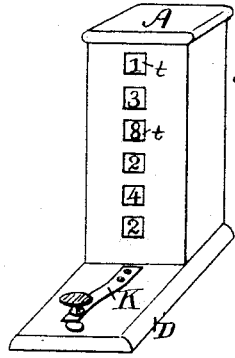
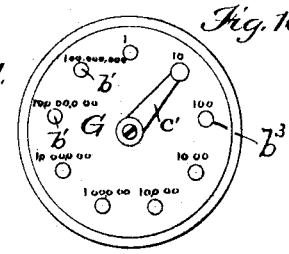
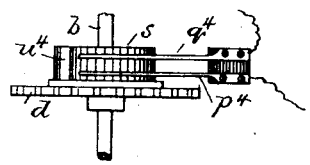
Witnesses.
W Rogers
A. L. White
Inventors.
Charles F. Pidgin
Francis H. Leonard Jr.
by Wright & Brown
Attys

UNITED STATES PATENT OFFICE.

CHARLES F. PIDGIN AND FRANCIS H. LEONARD, JR., OF BOSTON, MASS.

CALCULATING-MACHINE.

SPECIFICATION forming part of Letters Patent No. 284,755, dated September 11, 1883.

Application filed January 8, 1883. (No model.)

*To all whom it may concern:*

Be it known that we, CHARLES F. PIDGIN and FRANCIS H. LEONARD, Jr., both of Boston, in the county of Suffolk and State of Massachusetts, have invented certain Improvements in Adding or Calculating Machines, of which the following is a specification.

Our invention relates to the art of performing mathematical processes by electro-mechanical devices; and its object is to produce a convenient and comparatively simple apparatus whereby the process of addition, especially, may be manually carried on and the computation of large and small quantities effectuated with ease and rapidity.

In the apparatus which constitutes the embodiment of our invention we employ a distinct visual indicator for each numerical value from the unit-point, combined with suitable circuit-closing and indicator-operating devices, whereby each value may be correctly indicated on its respective recorder. For example, the units will be indicated on a dial exclusively devoted to units, the tens on a dial appropriated to tens, the hundreds on a dial for hundreds, and so on.

Our invention involves, also, other devices whereby the numbers appertaining to any standard of value may, when their sum as computed by the instrument exceeds the maximum of that standard, be carried on and added to the next higher order of numerical value, and whereby this carrying the excess of one order to the next higher order and adding them thereto is accomplished automatically and in due course by the simple and continuous operation of the devices appropriated to the value immediately below.

Our invention is not only applicable to the computation of values having a constant and regular ratio of increase or ascending scales, such as the decimal or metrical systems, but also to systems wherein the different orders are related to one another by uneven or arbitrary rates of increase, as the tables of sterling money. Inasmuch as it is so obvious that such an apparatus is most desirable, not only as an economizer of time in arithmetical operations, but likewise for the exactness of the results thus obtained, it is unnecessary that we should here further state its advantages.

In the drawings which illustrate and form a part of this specification, Figure 1 represents a perspective view of one form of the invention. Fig. 2 is a front view of one end of the same, portions being broken away for the purpose of clearly illustrating the method of operation and the functions of the mechanism; and Fig. 3 is a section across Fig. 2 on the line $x$ $x$. Fig. 4 is an enlarged view of one form of the "carrying" device shown in the foregoing figures. Fig. 5 is a section on line $y$ $y$ of the circuit-closer shown in sectional elevation in Fig. 3. Fig. 6 is a plan view of the circuit closing and breaking device, and Fig. 7 is a diagram of the electrical connections employed in this embodiment of our invention. Omitting for the present any mention of the intervening figures, Fig. 12 shows a modification of the automatic circuit-closer employed in the carrying device, and Fig. 15 a modification of the recording apparatus.

In the figures referred to, which show a single form of our invention and modifications of some of its constituent parts, A is the case, which contains all the parts, B being the upright box thereof, containing the mechanical mechanism; C, the front board of the indicator, being provided with suitable windows or apertures, $t$; and D, the table in which the electrical circuit-closing devices by which the recording-dials are actuated are supported.

As the several mechanisms constituting the indicating apparatus are alike in construction, it is only requisite that one of them shall be herein described.

Metal frames $a$ $a$ are maintained a suitable distance apart, and held together by braces or bolts in a manner well understood.

$b$ is a shaft or arbor, having bearings in the frames $a$ $a$, and provided at its front or outer end with a dial, $j$, the said dial being marked in this case with a double set of figures varying from zero to 9, each set occupying one-half of the circumferential front of the dial.

As hereinbefore indicated, openings $t$ are disposed suitably along the front of the outer casing, through which one figure or numeral of each dial is or may be shown.

Upon that portion of the shaft $b$ which is included between the different sides of the frame $a$ $a$ is a ratchet-wheel, $e$, and a plain wheel or disk, s, the latter being formed of non-conducting material, and having on its edge at opposite points thereof projecting studs u u. A second shaft, c, parallel to the first, has likewise its bearings in the frames a, and carries an escapement-lever, d, the pallets of which, d' d², are adapted to engage the teeth of the ratchet-wheel, and under certain conditions to rotate the said ratchet-wheel. The lever d has an arm, f, to which is secured the armature of an electro-magnet, M, the said electro-magnet being supported by a brace or bracket, v, attached to the frame a. A block of some non-conducting substance is affixed to the inner surface of the rear frame-plate, a, a flat spring, n, provided with an adjustable contact-screw, q, being fastened to its upper side, and a contact-spring, p, to its lower side. Normally the screw q is not in contact with the spring p, but the latter is within the range of the studs u on the periphery of the disk or wheel s, and consequently, when in the rotation of the said disk the stud passes under the spring p, the latter is raised and brought into momentary contact with the screw q.

Passing to the horizontal portion of the mechanism i is a metal plate, slotted centrally and longitudinally, as shown in Fig. 6, and fastened to the table D. Under the center of each plate a cavity, L, is formed in the table D, and to the bottom of this cavity five (5) curved springs, k, are fastened. h is a contact-maker or circuit closer and breaker, having a handle made of any non-conductor. It has a neck fitting in the slot of the plate i, and by means of a spring-plate, l, attached to its substance by the screw m, it is in permanent electrical contact with the plate i, as shown in Fig. 5.

The above instrumentalities constitute the mechanical details of our apparatus, it being well understood that the mechanisms of all the dials j are identical in construction and character, and capable of being worked independently of all of lower denomination.

By reference to Fig. 7 the electrical connections may be readily understood. o and o' are binding-screws forming the electrical terminals of the apparatus, to which wires extending from the poles of a battery are to be attached. Leading inward, a wire, I, extends from the binding-screw o, which we suppose to be connected with the positive pole of the battery. The wire I runs in normally-open branches to each and all of the slotted plates i. A second wire, 2, branches from the main line I, and is connected with the under spring, p, of each of the automatic circuit-closers, these branches likewise being normally open or insulated. Leading inward from the opposite binding-screw, o', the main wire diverges into a number of normally-open branches, as follows: Leaving the main wire, a branch wire, 6, is led through the electro-magnet M, which operates the right-hand or unit disk j and the right-hand circuit-closing disk s, and continues by wire 3 to the cavity L in the table, where it makes contact successively with the springs k, being united firmly to them in any suitable way, as shown in the diagram. The second branch wire, 9, is led first through the electro-magnet M' of the second or tens indicator, and from thence passes by wire 4 to the upper spring, n, of the first automatic circuit-closer, and, after making a branch connection therewith, it continues by the wire 3 to the springs k of the manual circuit-closer of the second dial, making successive contact with them in like manner as in No. 1. The third branch, 12, follows a similar course, passing first through the electro-magnet M² of the third indicator, thence by wire 4 to the upper spring of the second automatic circuit-closer, and from there by wire 3 to the springs k of No. 3 manual circuit-closer. The arrangements of circuits is similar throughout irrespective of the number of the dials, except that it is not necessary to provide the last dial and ratchet with an automatic circuit-closer.

Although we may in any case multiply the teeth of the ratchet-wheels, and correspondingly the studs upon the periphery of the circuit-closing disks, to any desired extent, for any calculations in the ordinary or decimal system they must be multiples of ten. Should we desire to arrange a system for the addition of English money, the right-hand ratchet would require teeth to the number of four or some multiple thereof, the second twelve or some multiple thereof, the third twenty or some multiple thereof, and the principle would be the same in any uneven system of calculation.

The plate i, Fig. 6, is graduated on its face for a decimal or metrical system, and the figures 1 to 9 marked thereon denote the number of units counted by one complete transit of the slide h from the inner to the outer extremity of the slot. When the instrument is quiescent before the commencement of an operation, all the slides h are arranged at the inner extremity of the slot, and all the indicators show zero at their respective apertures t.

In the operation of our invention, to indicate the number "1" on any of the indicators, the circuit-closer h of that indicator is drawn forward to make contact with the first spring, k, and the result appears by the presentation of the figure "1" at the corresponding aperture. If the indicator be the first one, the figures "1" will simply indicate unit 1; if the second, 10; if the third, 100; the fourth, 1,000, and so on. When the circuit-closer h is drawn forward to make contact with the first spring, k, the battery-circuit is closed through battery post or screw o, wire I, plate i, spring l, and screw m of circuit-closer h, contact-spring k, (and supposing we are operating the unit-slide,) wire 3, magnet-coil M, wire 6, common return-wire 11, and terminal o', thence to the other battery-pole or ground-wire. The electro-magnet M is thus vitalized and attracts the armature-arm f, causing the escapement to rotate the ratchet-wheel e one space, the dial $j$ of course rotating with it and showing the figure "1" at the opening $t$ of the casing. Every time the circuit-closer $h$ touches a spring, $k$, an electrical impulse is sent through the electro-magnet and the dial $j$ advances, as described. The projecting studs $u$ $u$ on the disks $s$ register with the zero-marks upon their corresponding dials $j$, so that when by successive impulses the ratchet-wheel $e$ has rotated until its dial has passed one number beyond "9," or until zero appears at the aperture, the stud $u$, or cam, as the case may be, will likewise have advanced until it is immediately under the spring $p$ of the automatic circuit-closing device. It will then press the spring $p$ upward, causing it to make contact with the adjustable contact-screw $q$ of spring $n$, and the contact thus formed closes the circuit of the battery automatically through the actuating electro-magnet M' of the second indicator by the following route: post $o$, wire 1, branch wire 2, branch wire 7, spring $p$, screw $q$, spring $n$, wire 8, magnet M', wire 9, return-wire 11, to post $o'$, and out. The electro-magnet of the indicating apparatus which is next in the ascending scale of numerical value—in this case the tens-indicator—is thus automatically brought into action, attracts its armature, and by the advance of its ratchet and dial discloses at its aperture $t$ a figure "1," which represents, of course, a value of ten, inasmuch as it is in the denomination of tens. This part of the indicating mechanism we term the "carrying apparatus," as it performs the operation of carrying one to the numerical denomination immediately higher in value. It will be observed that the electrical connections of the carrying part are such as to divert a portion of the current from its own electro-magnet and cause it to pass through and energize the electro-magnet of the indicator next in order or value, causing that apparatus to indicate "1, or," in other words, to "carry" one to the next column of figures.

To further illustrate the manipulation, referring again to Fig. 6: We have already described how one number is indicated on the dial $j$. Let it be supposed that we wish to add 29 to 33, the operation is as follows: To add 29 to 33, the unit-dial indicating "3" and the tens-dial indicating "3," to add the "9" to the three units, pull the unit-key down to the point numbered 9 and push it back, making five contacts going down and four going back. The unit-dial will then indicate "2" and on the tens-dial "1;" ten will be carried to the "3," changing it to four tens. To add the two tens, pull the tens-key to 2 and return, making one contact going and one returning. The tens-dial will then indicate "6" and the units-dial "2," reading from left to right "62," which is the sum of the two numbers 33 and 29. The machine will of course always show the sum of all numbers registered subsequent to the time it was last set at zero; and any number may be registered from 1 to 900,000,000, the simple registering of an additional number or numbers immediately changing the reading on the dials to the sum of the number previously registered and the amount added by the last operation.

Fig. 8 is a plan view of a modification of the hereinbefore-described mechanism, Fig. 9 an enlarged section thereof, and Fig. 10 an auxiliary device appertaining thereto. In this modification there is no change in the indicating part of the apparatus, the only difference being in the manually-operating devices. As before, we employ a series of contact-springs, $k$, opposite each indicating mechanism, and these we arrange upon a table, D, in front of the box A and between two metal rails, $a'$, forming a small track. The rails $a'$ $a'$ correspond to the plates $i$, Figs. 2, 3, and 6, and are connected by wire with one of the main binding-screws $o$. Each contact-spring $k$ is, in a similar manner to that shown in Fig. 7, connected by the wire 3 (through its own electro-magnet, and in every division but the extreme right through the automatic closer also) with the main return-wire 11 and binding-screw $o'$.

F is a movable frame or carriage, preferably of metal, which slides upon the rails $a'$ $a'$, and which is capable of sliding from end to end of the track. This carriage supports a series of circuit-closers—nine in number—each formed of a non-conducting disk, $x$, having a suitable handle whereby it may be actuated. Each disk oscillates upon an arbor, $x'$, common to the series, and supported in metal bearings, and from this shaft a metal plate extends on each of the disks to the edge thereof, projecting over the same in the form of teeth $z$, as shown in Fig. 9, where two such teeth are shown. The first disk to the right in Fig. 8 has one tooth, the second two, the third three, and so on up to the ninth, which has nine teeth. The carriage or movable frame F has a stepping, $w$, which passes through its substance and into a hole, $w'$, in the table D, operating as an anchor to hold the frame still upon any denomination where it is placed. The teeth of all the circuit-closers are, by means of the shaft $x'$—which is common to all the circuit-closers—the metal bearings of said shaft, and the substance of the carriage F, in constant electrical connection with the rails $a'$ and the binding-screw $o$, and if the substance of the carriage is not a conductor it may be provided with metal shoes or runners, which may slide on the rails, and which may by wires be connected with the shaft $x'$. In the operation of this modification the frame F is moved opposite the desired indicator, and the pin $w$ inserted to maintain it in a stable condition. Normally, the handles of the disks rest as shown in full lines in Fig. 9, and when it is desired to add or indicate any specified number the handle of the requisite disk is brought forward to the position shown in dotted lines. By this movement the teeth $z$ are brought into contact and pass over the contact-springs $k$, and impulses of electricity then pass through the circuit thus completed from the battery screw-post $o$, wire I, rails $a'a'$, metal frame or carriage F, through the shaft $x'$, teeth $z$, and spring $k$ thence to the electro-magnet, which operates the dial, and out by binding-screw $o'$, as hereinbefore described, as many times as the contact is made by the teeth $z$, thus by one operation indicating and adding the figures on the dial.

By substituting the circular switch G, Fig. 10, for the rails $a'$ and section-springs $k$, the frame F may be operated in one fixed position, the figures being indicated on the tens-indicator when the arm $c'$ rests on the stud 10, on the hundreds-indicator when resting on the stud 100, and so on. Wires in this case of course connect each stud with its proper indicator, and one spring $k$ is enabled to serve all the indicators.

The disk circuit-closers may be operated by bringing the handles forward, and so leaving them until the same number is to be added again, when the disk may then be brought back, as bringing it forward and then back will double the amount added.

A great advantage of the sliding carriage is as follows: When very long columns of figures are to be added, the carriage may be located before the units, tens, &c., and all the units, tens, &c., can be added without moving the carriage or the switch. When numbers taken from different papers or schedules or pages of books are to be added, the better plan will be to begin with the left-hand digit of the number, although the machine will add equally well from right to left; or the additions can be begun at any column and added right or left from it.

Figs. 13 and 14 are modifications of the indicating mechanism, D being the table upon which the usual number of apparatuses are arranged. In this case the ratchet-wheel $e$ has forty teeth, its dial of course having four series of numerals and its insulating-disk four studs, $u$. M is the electro-magnet, $f$ its armature, and $e'$ a lever operated thereby, and carrying on the end of its long arm a hook-lever or forwarding-pawl, $d^1$, and this, engaging with the teeth of the ratchet $e$, causes the said ratchet to rotate when the armature is attracted by the electro-magnet. $n$ and $p$ are the springs of the automatic circuit-closer, and $h^4$ is a resilient press-button, which, when pressed forces down one of the levers $j^2$, this in turn, operating upon the lever $g'$ and causing its upper end to advance into and over the path of the armature-lever $e'$, by which the movement of the said armature-lever $e'$ may be suitably limited, and its progress arrested when it has advanced far enough. The several indicators are similar in construction, except that the length of the upper part of the levers $g'$ may be in each successive indicator made longer, so as to arrest the levers $e'$ at different points of their upward progress. In the first indicator, for example, this arm may be just long enough to rise sufficiently to rotate the ratchet $d$ one tooth, in the second two teeth, &c. To cause a dial to record, add, or indicate any specified number, the corresponding push-button, $h^4$, is depressed, making contact through lever $j^2$ with the anvil $j^3$, and closing the battery-circuit through the electro-magnet operating its armature, and turning the ratchet-wheel and dial, which are on the same shaft, the required number of teeth, the upper end of lever $g'$ arresting the further movement, as described. When the push-button $h^4$ is allowed to spring up, the circuit is broken and the levers resume their normal position.

Fig. 12 is a modification of the carrying device operating electrically instead of mechanically. The disk $s$ is of non-conducting material, as in Figs. 3 and 4; but in place of the stud a piece of metal, $u^4$, is inserted flush with the periphery of the wheel. Two springs, $q^4$ $p^4$, press with their free ends upon the periphery, their opposite ends being fixed and secured upon a block of non-conducting material. When by reason of a definite number of electrical pulsations the wheel has advanced until the metal piece $u^4$ comes under the points $q^4 p^4$, the circuit of the next indicator-magnet is closed through the metal piece and the two springs $q^4 p^4$.

Fig. 15 is another form of limiting or arresting mechanism whereby the distance of rotation of a ratchet-wheel at any one pulsation is regulated. The armature $f$ is pivoted at $f'$, and to its free and movable end a curved pawl, $d^4$, is suspended, while from the fulcrum end a retaining-pawl, $f^2$, hangs, whereby any backward movement of the ratchet-wheel during the back stroke of the armature is prevented. When the electro-magnet draws the armature and pawl $d^4$ up, the lower end of the pawl is jammed against the pin $d^3$ and the ratchet, and any uneven or undesirable advance of the latter is thus prevented.

Fig. 11 is a tabulating-machine, and is adapted for use in cases when the registrations desired are to be secured by the addition of one at a time. In this instrument the entire number of dials are placed one above the other in a box, A. One circuit-closing key, K, only is requisite, and each one of the upper dials is worked exclusively by the dial immediately below it. Each time the key is pressed the lowest dial advances, and when it has reached any predetermined point it advances the second uppermost dial one point, which in turn, after a suitable number of advances, closes the circuit of the third, and so on *ad libitum*. As alternative devices to the key, any of the other instrumentalities which we have described may be utilized to actuate the mechanism in this modification. All the types of machine which we have described are portable, the largest size being not more than eighteen inches long, six inches wide, and five inches high.

Obviously the capacity of any of the hereinbefore-described machines can be increased indefinitely by increasing the number of dials and the necessary moving mechanism. Any of the machines, moreover, may be operated equally well by manipulating a normally-closed circuit as by closing a normally-open circuit. If desired, two calculations can be performed on the same machine by deciding upon a division-line between any two dials. Thus three wheels to 999, and the remaining six to 999,999, or any other arbitrary division.

In all the foregoing types it is evident that the dials, in order that space may be economized, may overlap one another, as shown in Fig. 2, where the dials $j'$ are represented partly in dotted lines. The dials may be set by hand when necessary by revolving the handles $g$, Fig. 1.

We claim—

1. In an electro-magnetic calculating and adding machine, an automatic electric carrying device, whereby the figures of one arithmetical denomination are automatically carried to the next, substantially as described.

2. In an electro-magnetic indicating or adding machine consisting of a series of dials, each bearing a definite number of figures in regular order, and all arranged in an order corresponding to successive arithmetical denominations, a series of electro-magnets, one for each dial, each in a normally-open electric branch circuit, and each provided with an armature, levers, and pawls, a series of ratchet-wheels, one for each indicator, adapted to be rotated by the said armature-pawls, a series of manual sliding circuit-closers, one for each indicating-dial, each circuit-closer consisting of a sliding conductor and a number of contact-springs, whereby the successive contacts of the slider with the several springs sends a corresponding number of electric impulses through the electro-magnet thereof, and a series of automatic circuit-closers, whereby at predetermined periods the branch circuit of any indicating-dial may be closed by the rotating mechanism of the dial of the denomination next below, for the purpose of carrying the superfluous figures from one denomination to the next, substantially as described.

3. In an electro-magnetic adding-machine, the combination of a series of numbered dials, each one representing a definite arithmetical denomination, a series of circuit-closers, one for each dial, intermediate mechanical operating devices, whereby each circuit-closer is enabled to rotate its own dial by successive steps, and means whereby the advance of any one dial a definite number of steps causes the dial of the next higher denomination to advance one step, substantially as described.

4. In an electro-magnetic adding-machine, the combination, substantially as hereinbefore described, of a main circuit, a series of branch circuits, a series of manual circuit-closers, one for each branch, and a series of automatic circuit-closers and controlling devices therefor, whereby the manual circuit-closers are adapted, when successively operated a definite number of times, to close the branch circuit next in succession thereto.

5. In an adding-machine, electrical circuit-closing devices consisting of a pair of metal rails connected with one wire of an electric circuit, a sliding carriage supported on the said rails and movable thereon, a series of circuit closers and interrupters pivoted in the said movable carriage and connected through the substance thereof with the rails and electric circuit, and a series of contact-springs, $k$, fixed between the rails, and each connected through its own electro-magnet with a return electric circuit, the whole adapted for operation as described.

6. In an electro-magnetic adding-machine, a sliding circuit-closer consisting of a slotted metal frame connected with a branch wire of a normally-open circuit electrically connected therewith, and a sliding contact-maker capable of longitudinal movement therein, combined with a series of circuit-springs disposed successively below the slotted frame, each being connected with the return-wire of the said open circuit and extending upward in the path of the sliding contact, whereby when the said contact-maker is caused to slide along the slot it is brought into contact successively with the several springs in its path, for the purpose set forth.

7. In an electro-magnetic adding-machine, the combination, substantially as hereinbefore described, of a series of indicating-dials carrying definite numbers on their surface, each representing definite arithmetical denominations, a series of manual circuit-closers for each dial, an electro-magnet and an armature and pawls adapted to rotate a ratchet-wheel on the dial-shaft, and a series of automatic circuit-closers, whereby each indicator is enabled, after a definite number of advances, to close the circuit of the electro-magnet of the indicator next higher in order and advance the dial thereof one step, for the purposes specified.

In testimony whereof we have signed our names to this specification, in the presence of two subscribing witnesses, this 1st day of January, 1883.

CHARLES F. PIDGIN.
FRANCIS H. LEONARD, Jr.

Witnesses:
C. F. BROWN,
H. G. WADLIN.